United States Patent [19]
Bowes et al.

[11] 4,144,190

[45] Mar. 13, 1979

[54] POLYSACCHARIDE-CONTAINING ADSORBENT

[75] Inventors: Quentin Bowes, Rheinfelden; Jaroslav Haase, Riehen; Rudolf F. Wurster, Pfeffingen, all of Switzerland

[73] Assignee: Ciba-Geigy AG, Basel, Switzerland

[21] Appl. No.: 810,838

[22] Filed: Jun. 28, 1977

[30] Foreign Application Priority Data

Jul. 8, 1976 [LU] Luxembourg ............................ 75329
Oct. 3, 1976 [LU] Luxembourg ............................ 76120

[51] Int. Cl.$^2$ ............................ C02B 1/46; C02B 1/52
[52] U.S. Cl. ................................... 252/427; 252/426
[58] Field of Search ................................ 252/426, 427

[56] References Cited

U.S. PATENT DOCUMENTS 3,538,020  11/1970  Heskett et al. .................. 252/426 X
3,673,110   6/1972  Edwards ............................ 252/427
3,864,327   2/1975  Marchant ........................ 252/426 X
4,003,848   1/1977  Clotter et al. ..................... 252/427

*Primary Examiner*—Patrick Garvin
*Attorney, Agent, or Firm*—Sprung, Felfe, Horn, Lynch & Kramer

[57] ABSTRACT

A polysaccharide-containing adsorbent for the removal of heavy metal ions from an effluent which adsorbent has been manufactured from (1) a polysaccharide-containing material,
(2) a basic, nitrogen-containing polymer which can be acylated,
(3) a crosslinking compound, which is different from component (4), containing at least two reactive substituents and, optionally,
(4) an aliphatic or araliphatic carboxylic acid containing a mobile substituent or a multiple bond which is capable of undergoing addition.

15 Claims, No Drawings

POLYSACCHARIDE-CONTAINING ADSORBENT

The present invention relates to a polysaccharide-containing absorbent which is suitable for removing or collecting heavy metal ions from liquids.

The new absorbent is characterised in that it has been prepared from
(1) a polysaccharide-containing material,
(2) a basic, nitrogen-containing polymer which can be acylated,
(3) a crosslinking compound, which is different from component (4), containing at least two reactive substituents and, optionally,
(4) an aliphatic or araliphatic carboxylic acid containing mobile substituents, in particular halogen atoms, or a multiple bond which is capable of undergoing addition.

The new absorbent is appropriately characterised in that it has been obtained from the four components (1), (2), (3) and (4).

The new adsorbents can be manufactured by reacting or mixing and reacting the three or four different components in any desired sequence.

However, these products are preferably manufactured by mixing
(1) the polysaccharide-containing material with a previously obtained reaction product of
(2) basic, nitrogen-containing polymers which can be acylated and
(4) an aliphatic or araliphatic carboxylic acid containing mobile substituents or a multiple bond which is capable of undergoing addition, and then crosslinking the mixture with component (3).

The adsorbents can also be manufactured by first reacting the condensate of components (2) and (4) with component (3) and then subjecting the reaction product to a further condensation reaction with the polysaccharide-containing material (1).

A further particular embodiment for the manufacture of the polysaccharide-containing adsorbents consists in first allowing component (3) to react with the polysaccharide-containing material (1) and then further reacting the product with the reaction product of components (2) and (4).

The polysaccharide-containing adsorbent is advantageously built up from 1 base mol of component (1), 0.05 to 1 base mol, preferably 0.3 to 0.7 base mol, of component (2), 0.01 to 0.7 mol, preferably 0.1 to 0.3 mol, of component (3) and 0.01 to 0.7 mol, preferably 0.1 to 0.3 mol, of component (4), the base mol/mol ratio of component (2) to component (4) being greater than 1.4.

Base mol is to be understood as the molecular weight of the recurring structural element within the polymer molecule.

In addition, adsorbents which are also suitable can also be obtained from only components (1), (2) and (3), that is to say without using component (4). Component (4) can thus optionally also be employed in amounts from 0 to 0.7 mol, preferably 0 to 0.3 mol.

The polysaccharide-containing materials (1) required as starting substances are, above all, bleached or unbleached spruce sulphite cellulose, Kraft sulphate cellulose, paper waste paper, cardboard products and textile fibres made of cotton, rayon staple, jute, ramie, hemp or linen. Further polysaccharide-containing materials can be peat, mechanical wood pulp, sawdust, wood fibres, wood flour, cork flour, lignite, bark, cereal waste, viscose and also starch.

In principle, polymers which contain amino groups which can be acylated, that is to say which contain primary or secondary amino groups, are suitable as basic, nitrogen-containing polymeric compounds (2) for the manufacture of the adsorbents according to the invention.

Suitable basic polymers are, above all, the polyalkyleneimines which appropriately have an average molecular weight (MW) of 5,000 to 200,000, preferably 10,000 to 100,000. In general, these polymers possess a Brookfield viscosity at 20° C. of 500 to 20,000 centipoises (cp). The polyalkyleneimines are preferably derived from alkyleneimines with 2 to 4 carbon atoms. Suitable alkyleneimines are, in particular, ethyleneimine, propyleneimine, 1,2-butyleneimine and 2,3-butyleneimine. Of all the polyalkyleneimines, polyethyleneimine is preferably used. Polyethyleneimines which have an average molecular weight of 10,000 to 100,000, in particular 30,000 to 40,000, are of particular practical interest.

Reaction products of halogenohydrins or dihalogenohydrins and alkylene- or polyalkylenepolyamines or -imines, such as, for example, reaction products of epichlorohydrin and diethylenetriamine, dipropylenetriamine or triethylenetetramine or polyethyleneimine, can also be employed as basic polymers which can be acylated. Basic reaction products of this type are described, for example, in German Auslegeschrift No. 1,010,736.

Soluble, basic polyamides which are manufactured by a condensation reaction of polycarboxylic acids containing 2 to 10 carbon atoms, preferably dibasic carboxylic acids, for example adipic acid, or functional derivatives thereof, such as, for example, esters, amides or anhydrides, and polyamines, in particular polyalkylenepolyamines, such as are described, for example, in U.S. Pat. No. 2,882,185, are also suitable as basic, nitrogen-containing polymers which can be acylated.

The polyamide polyamines which are obtained by reacting polymerised, preferably dimerised to trimerised, fatty acids with polyamines, appropriately in a ratio such that the polyamide resin formed has an amine value in the range from approximately 200 to 650 mg of potassium hydroxide per gram of polyamidepolyamine, are also of particular practical interest as basic polymers which can be acylated.

Aromatic polyamines or, in particular, aliphatic polyamines, which can also contain heterocyclic structures, such as, for example, imidazolines, can also be employed as polyamines which can be used for the manufacture of the basic polyamides. The aliphatic polyamines are preferably alkylenepolyamines with a total of 2 to 8 carbon atoms and 2 to 5 amino groups.

Polymeric fatty acids, which are advantageously present in polyamides of this type, are obtained by polymerising one or more unsaturated, long-chain, aliphatic or aromatic-aliphatic acids or esters or other derivatives thereof, which can be easily converted into the acid. Suitable examples of such polymeric fatty acids are described in British Patent Specifications Nos. 878,985 and 841,554.

The polyamidepolyamines are preferably manufactured from polyalkylenepolyamines and aliphatic, ethylenically unsaturated dimeric to trimeric fatty acids which are derived from monocarboxylic acids with 16 to 22 carbon atoms. These monocarboxylic acids are fatty acids with at least one, preferably 2 to 5, ethylenically unsaturated bonds. Representatives of this class of acids are, for example, oleic acid, hiragonic acid, eleostearic acid, licanic acid, arachidonic acid, clupanodonic acid and, in particular, linoleic and linolenic acid. These fatty acids can be isolated from natural oils, in which they occur, above all, as glycerides.

Dimerised to trimerised linoleic or linolenic acids are particularly suitable. As a rule, the technical products of these acids contain 75 to 95 percent by weight of dimeric acid, 4 to 22 percent by weight of trimeric acid and 1 to 3 percent by weight of monomeric acid.

A typical representative of the polyamidepolyamines is obtained from polymerised linoleic acid/linolenic acid and triethylenetetraamine and has an amine value of 350 to 400 mg of KOH/g.

Further basic polyamide resins, which can be acylated, which can be used according to the invention are, for example, the products obtained by reacting halogenohydrins, for example epichlorohydrin, with aminopolyamides from polyalkyleneamines and aliphatic dicarboxylic acids containing 2 to 10 carbon atoms, such as are described, for example, in U.S. Pat. No. 3,311,594.

Basic polyamides which are obtained by condensation polymerisation at high temperatures from a reaction mixture containing polymeric fatty acids (manufactured according to British Patent Specification Nos. 878,985 and No. 841,544), monomeric fatty acids and lower polyalkylenepolyamines can also be used as component (2) in the present invention.

Monomeric or polymeric compounds which possess crosslinking properties and which can form a chemical bond either with the polysaccharide-containing material (1) or with the basic, polymeric compound (2), or with both, can be used as component (3). These compounds, containing at least two functional groups, owe their reactivity to a multiple bond which is capable of addition, an epoxy group or aziridine group, a substituent which can be split off as a tertiary amine or, preferably, a substituent which can be split off as an anion; a combination of these factors can also be present. They contain, for example, the grouping

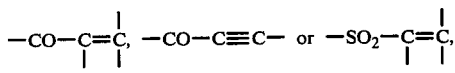

or also the isocyanate or isothiocyanate group as a multiple bond which can undergo addition. Component (3) can contain quaternary ammonium groups which are split off as tertiary amines, such as, for example, the trimethylammonium or pyridinium group, or also sulphonium groups as groups which can be split off. However, component (3) contains substituents with a radical which can be split off as an anion, preferably with mobile halogen atoms, as a preferred, reactive group. Radicals of this type which can be split off as an anion owe their mobility, for example, to the influence of electrophilic groups, such as the —CO— or —SO$_2$— group in saturated, aliphatic radicals. They can also owe their mobility to the influence of a quaternary nitrogen atom, such as in the group

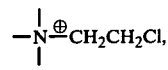

or, in aromatic radicals, to the influence of electrophilic groups in the o-position and p-position, for example nitro groups, hydrocarbon-sulphonyl groups or hydrocarbon-carbonyl groups, or to the bond to a ring carbon atom which is adjacent to a tertiary ring nitrogen atom, such as in halogenotriazine radicals or halogenopyrimidine radicals.

Cyclic carbonic acid imide-halides and, above all, halogenodiazine or halogenotriazine compounds containing at least two mobile substituents, especially two mobile halogen atoms, have proved particularly advantageous as component (3).

The cyclic carbonic acid imide-halides used here as component (3) are advantageously.

a. s-triazine compounds with at least two halogen atoms bonded to carbon atoms, such as, for example, cyanuric chloride, cyanuric fluoride and cyanuric bromide, as well as the primary condensation products of cyanuric fluoride or cyanuric chloride or cyanuric bromide and, for example, water, ammonia, amines, alkanols, alkylmercaptans, phenols or thiophenols;

b. pyrimidines with at least two reactive halogen atoms, such as 2,4,6-trichloro-, 2,4,6-trifluoro- or 2,4,6-tribromopyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulphonyl, carboxylic acid amide or sulphonic acid amide group, but preferably by halogen, such as, for example, chlorine, bromine or fluorine. Particularly suitable halogenopyrimidines are 2,4,6-trichloro- and 2,4,5,6-tetrachloropyrimidine;

c. halogenopyrimidinecarboxylic acid halides, such as, for example, dichloropyrimidine-5- or -6-carboxylic acid chloride;

d. 2,3-dihalogeno-quinoxaline-, -quinazoline- or -phthalazinecarboxylic acid halides or -sulphonic acid halides, such as 2,3-dichloro-quinoxaline-6-carboxylic acid chloride or -6-sulphonic acid chloride, 2,6-dichloroquinazoline-6- or -7-carboxylic acid chloride or 1,4-dichlorophthalazine-6-carboxylic acid chloride or bromide;

e. 2-halogeno-benzo-thiazole- or -oxazole-carboxylic acid halides or -sulphonic acid halides, such as 2-chlorobenzothiazole- or -oxazole-5- or -6-carboxylic acid chloride or -5- or -6-sulphonic acid chloride; and f. halogeno-6-pyridazonyl-1-alkanoyl halides or -1-benzoylhalides, such as, for example, 4,5-dichloro-6-pyridazonyl-1-propionyl chloride or -1-benzoyl chloride.

Further compounds, containing at least two reactive substituents, which can be employed as component (3) are, for example g. anhydrides or halides of aliphatic, α,β-unsaturated monocarboxylic or dicarboxylic acids with preferably 3 to 5 carbon atoms, such as maleic anhydride, acrylyl chloride, methacrylyl chloride and propiolyl chloride;

h. anhydrides or halides of aliphatic monocarboxylic or dicarboxylic acids, with preferably 3 to 10 carbon atoms, or aromatic carboxylic acids, which contain mobile halogen atoms, such as, for example, chloroacetyl chloride, β-chloropropionyl chloride, α,β-dibromopropionyl chloride, α-chloro- or β-chloro-acrylyl chloride, chloromaleic anhydride or β-chlorocrotonyl chloride, or fluoro-nitro- or chloro-nitrobenzoyl halides or -benzenesulphonyl halides in which the fluorine or chlorine atom is in the o-position and/or p-position to the nitro group;

i. carboxylic acid N-methylolamides or reactive, functional derivatives of these methylol compounds. Carboxylic acid N-methylolamides which can be used are, above all, N-methylol-chloroacetamide, N-methylol-bromoacetamide, N-methylol-α,β-dichloro- or -dibromo-propionamide, N-methylol-acrylamide or N-methylol-α-chloro- or -α-bromo-acrylamide. Possible reactive derivatives of the carboxylic acid N-methylolamides are, for example, the corresponding N-chloromethyl- or N-bromomethyl-amides;

j. optionally etherified N-methylolureas or N-methylolmelamines, such as, for example, N,N-dimethylolurea, N,N'-dimethylolurea dimethyl ether, N,N'-dimethylol-ethylene- or -propylene-urea, 4,5-dihydroxy-N,N'-dimethylol-ethyleneurea or -dimethyl ether, and di-bis-hexamethylolmelamine, trimethylolmelamine dimethyl ether, pentamethylolmelamine di-bis-trimethyl ether or hexamethylolmelamine penta- or hexamethyl ether; and k. condensation products of diarylalkanes containing at least one phenolic hydroxyl group and halogenohydrins, for example the diepoxide from 2,2-bis-(4'-hydroxyphenyl)-propane and epichlorohydrin, and also glycerol trigylcidyl ether.

The component (4) required for the polysaccharide-containing adsorbents according to the invention serves to form the chelate-forming aminoacid group. For this purpose, the basic, polymeric component (2) is appropriately first reacted with component (4), which contains carboxyl groups. Aliphatic or araliphatic carboxylic acids or their alkali metal salts, which contain mobile halogen atoms or multiple bonds which are capable of undergoing addition, in particular C-C double bonds, are appropriate as component (4). Possible mobile halogen atoms are, for example, bromine, fluorine or, preferably, chlorine, which owe their mobility, for example, to the bond to α-carbon or β-carbon atoms of the carboxylic acids.

Suitable carboxylic acids containing mobile halogen atoms are halogenoacetic acids, which are optionally substituted in the α-position by lower alkyl, lower alkoxy, hydroxy-lower alkyl, lower alkoxy-lower alkyl, lower alkylthio-lower alkyl, carboxy-lower alkyl, phenyl or benzyl. The acid radical is preferably present in salt form, for example as the alkali metal salt, such as the sodium or potassium salt.

Examples of halogenocarboxylic acids which can be used are chloroacetic acid, bromoacetic acid, α-chloropropionic acid, β-chloro- or β-bromo-propionic acid, α-chloro-β-hydroxypropionic acid, chlorosuccinic acid, α-phenyl-α-chloro- or -α-bromo-acetic acid, β-bromo-β-phenyl-propionic acid or α-chloro-β-methylthio-propionic acid, and also α- or β-chloro- or -bromo-acrylic acid, α,β-dichloro- or -dibromo-acrylic acid, α-, β-, or γ-chloro- or -bromo-crotonic acid, α,β-dichlorocrotonic acid and chloro- or -bromo-maleic or -fumaric acid. Chloroacetic acid is particularly preferred. A possible multiple bond which is capable of undergoing addition is, for example, the C—C double bond or C—C triple bond in the adjacent position to the carboxyl group. Examples of carboxylic acids which are capable of undergoing addition are acrylic acid, methacrylic acid, crotonic acid, propiolic acid, maleic acid or fumaric acid. Mobile substituents in component (4) can also be OH groups and their etherified or esterified forms.

Lower alkyl and lower alkoxy in the definition of the radicals of the components (3) and (4) which can be used for modifying the polysaccharide materials are, in general, those groups which contain 1 to 5, in particular 1 to 3, carbon atoms, such as, for example, methyl, ethyl, n-propyl, isopropyl, n-butyl, sec.-butyl or amyl and, respectively, methoxy, ethoxy or isopropoxy. Halogen in connection with all the above substituents denotes, for example, fluorine, bromine or, preferably, chlorine.

Preferred, polysaccharide-containing adsorbents can be manufactured by reacting cellulose materials with a condensate of a polyethyleneimine having an average molecular weight of 10,000–100,000, especially 30,000 to 40,000, and a halogenoacetic acid of the type mentioned initially, optionally substituted in the α-position, in particular chloroacetic acid, and then subjecting the product to a further condensation reaction with a halogeno-diazine or -triazine compound containing at least two mobile substituents, especially cyanuric chloride.

The reaction conditions for the manufacture of the adsorbents according to the invention are to be chosen, depending on the sequence of the starting materials used, so that premature exchange of the mobile substituents does not occur either as a result of too high pH values of the reaction medium or as a result of too high temperatures. The reaction is therefore preferably carried out in a very dilute, aqueous medium under temperature and pH conditions which are as mild as possible, that is to say, depending on the stability and reactivity of components (3) and (4), at temperatures from 0° to 80° C. and at pH values from 3 to 8, preferably in the presence of agents which neutralise mineral acid such as, for example, sodium acetate, sodium carbonate or sodium hydroxide. Depending on the properties of the components, the reactions can be carried out in solution or in fine dispersion, for example as suspensions or emulsions, optionally with the aid of inert organic solvents which can be easily removed, such as lower aliphatic ketones.

The polysaccharide-containing adsorbent according to the invention is suitable, above all, for removing or collecting heavy metal ions, the effectiveness of the new adsorbent being significantly higher than that which is achieved with conventional adsorbents. The metal content in effluent can be reduced to virtually negligible amounts of 2.5 ppm, in some cases even of 0.1 ppm, by the adsorbent according to the invention, so that effluent treated with it can be discharged as being free from heavy metals.

Effluents to be treated with the adsorbents according to the invention include various industrial effluents which contain ions of metals with a standard potential of, as a rule, more than −1.5 V, preferably between −1.0 to +0.85 V, at 25° C. Such metal ions are, for example, $Cd^{++}$, and $Cu^{++}$, $Ni^{++}$, $Sn^{++}$, $Pb^{++}$, $Hg^{++}$, $Ag^+$, $Fe^{+++}$, $Cr^{+++}$ and $Co^{+++}$.

The removal of the metal ions is appropriately carried out at 10° to 100° C.

However, it is preferably carried out between 20° and 70° C. If desired, the purification of the effluents can also be carried out under pressure or under a vacuum. The pH value of the effluents can vary within wide limits, for example between 2 and 12. However, depending on the nature of the modified polysaccharide material used as the adsorbent, pH correction, for example to a value of 2 to 9, in particular 3 to 6, can facilitate or accelerate the purification process.

The treatment of the effluents can be carried out discontinuously, semi-continuously or continuously. In principle, the following embodiments are suitable in the sense of the invention:

a. The so-called stirring process in which the water to be purified is stirred with the polysaccharide material in a vessel or a series of vessels and then separated off;

b. the so-called fluidised bed process in which the polysaccharide material is kept in a suspended state by the flow of the liquor to be purified; and c. the so-called fixed bed process in which the liquor to be purified is fed through polysaccharide material arranged in a filter-like manner.

If, of these three process variants, the fixed bed process (c) is used, the following three apparatus variants, above all, are suitable:

1. The treatment apparatus, for example a dyeing machine, is fixedly connected to the adsorber equipment.

2. The adsorber equipment is mobile and can be coupled with any treatment apparatus as required.

3. The effluents originating from the treatment liquors are combined in a suitable container and then fed together through the cellulose material.

Depending on the nature of the metal ions to be separated off, the amount of the adsorbents to be used for removing the metal ions can vary over a wide range. By suitably choosing the polysaccharide material, up to 95–100% of the metal ions can be extracted from the effluents. In cases where it is not possible to achieve complete removal of the metal ions by a single treatment of the effluents with the adsorbent, it is advisable to repeat the purification procedure.

In the following Examples, percentages are always percentages by weight.

EXAMPLE 1

Bleached spruce sulphite cellulose pulp (Schopper-Riegler freeness, 18–20) is squeezed out to a stuff with a solids content of 32.9%. 152 g of this cellulose material are introduced into 2 liters of water and the mixture is stirred for 30 minutes. Thereafter, 28.15 g of a condensation product of a polyethyleneimine having an average molecular weight of 30,000–40,000 and monochloroacetic acid (ratio of nitrogen:chlorine 3:1) are stirred into the mixture during 1 hour. 35.7 g of cyanuric chloride dissolved in 200 ml of acetone are then poured in in the course of 10 minutes, after which the mixture is kept at a pH value of 1 for 18 hours and, after adding 1 N sodium hydroxide solution, at a pH value of 10 for 3 hours. The product is filtered off and washed thoroughly. 330 g of an adsorbent with a solids content of 29% are obtained. The nitrogen content is 10.0%.

EXAMPLE 2

608 g of bleached spruce sulphite cellulose pulp with a solids content of 32.9% are introduced into 8 liters of water and the mixture is stirred for 30 minutes. Thereafter, 55.34 g of a condensation product of a polyethyleneimine having an average molecular weight of 30,000–40,000 and monochloroacetic acid (ratio of basic nitrogen:chlorine 3:2) are stirred into the mixture during one hour. 71.4 g of cyanuric chloride dissolved in 300 ml of acetone are then poured in in the course of 10 minutes, after which the mixture is kept at a pH value of 1 for 18 hours and, after adding 1 N sodium hydroxide solution, at a pH value of 10 for 3 hours. The product is filtered off and washed thoroughly. 1,051 g of an adsorbent with a solids content of 21.6% are obtained. The nitrogen content is 2.08%.

EXAMPLE 3

139.2 g of bleached spruce sulphite cellulose pulp with a solids content of 35.9% are introduced into 1.5 l of water and the mixture is stirred for 30 minutes. Thereafter, 50.12 g of a condensation product of a polyethyleneimine having an average molecular weight of 30,000–40,000 and β-chloropropionic acid (ratio of basic nitrogen:chlorine 5:3) in 500 ml of water are stirred into the mixture during 30 minutes. 42.9 g of cyanuric chloride dissolved in 400 ml of acetone are then added dropwise in the course of 10 minutes, whilst stirring thoroughly, after which the mixture is kept at a pH value of about 1 for 17 hours and, after adding 4 N sodium hydroxide solution, at a pH value of 8.5–9.5 for 5 hours. The product is filtered off and washed thoroughly. 474.9 g of an adsorbent with a solids content of 18.27% and a nitrogen content of 12.32% are obtained.

EXAMPLE 4

139.2 g of bleached spruce sulphite cellulose pulp with a solids content of 35.9% are introduced into 1.5 l of water and the mixture is stirred for 30 minutes. Thereafter, 47.0 g of a condensation product of a polyethyleneimine having an average molecular weight of 30,000–40,000 and α-phenyl-α-bromoacetic acid (ratio of basic nitrogen:chlorine 1:0.6) dissolved in 427.5 ml of water are stirred into the mixture during 30 minutes. 42.9 g of cyanuric chloride dissolved in 400 ml of acetone are then added dropwise in the course of 10 minutes, whilst stirring thoroughly, after which the mixture is kept at a pH value of 1–2 for 15 hours and, after adding 4 N sodium hydroxide solution, at a pH value of 9–10 for 5 hours. The product is filtered off and washed thoroughly. 514 g of an adsorbent with a solids content of 22.5% and a nitrogen content of 11.7% are obtained.

EXAMPLE 5

25.6 g of bleached spruce sulphite cellulose pulp with a solids content of 35.9% are introduced into 400 ml of water and the mixture is stirred for 30 minutes. Thereafter, 19.0 g of a condensation product of a polyethyleneimine having an average molecular weight of 30,000–40,000 and monochlorosuccinic acid (ratio of basic nitrogen:chlorine 1:1.09) dissolved in 252 ml of water are stirred into the mixture during 30 minutes. 7.89 g of cyanuric chloride dissolved in 100 ml of acetone are then poured in in the course of 10 minutes, after which the mixture is kept at a pH value of 2.0 for 7 hours and, after adding 4 N sodium hydroxide solution, at a pH value of 9.5–10 for 7 hours. The product is filtered off, washed thoroughly and dried. 19.6 g of a dry adsorbent with a nitrogen content of 8.9% are obtained.

EXAMPLE 6

161.9 g of bleached spruce sulphite cellulose pulp with a solids content of 30.9% are introduced into 1.9 l of water and the mixture is stirred for 30 minutes. Thereafter, 6.06 g of a polyethyleneimine having an average molecular weight of 30,000–40,000 dissolved in 100 ml of water are stirred into the mixture during 10 minutes. 7.36 g of cyanuric chloride dissolved in 50 ml of acetone are then added dropwise in the course of 10 minutes, after which the mixture is kept at a temperature of 80° C. and, after adding 1 N sodium hydroxide solution, at a pH value of 8 for 6.5 hours. The product is cooled, filtered off and washed thoroughly. 214 g of an adsorbent with a solids content of 27.7% and a nitrogen content of 5.9% are obtained.

EXAMPLE 7

161.9 g of bleached spruce sulphite cellulose pulp with a solids content of 30.9% are introduced into 1.9 l of water and the mixture is stirred for 30 minutes. Thereafter, 6.06 g of a polyethyleneimine having an average molecular weight of 30,000–40,000 dissolved in 100 ml of water are stirred into the mixture during 30 minutes. 6.36 g of cyanuric chloride dissolved in 50 ml of acetone are then poured in in the course of 10 minutes, after which the mixture is kept at a pH value of 1 for 20 hours and, after adding 1 N sodium hydroxide solution, at a pH value of 10 for 3 hours. The product is filtered off and washed thoroughly. 216 g of an adsorbent with a solids content of 27.8% and a nitrogen content of 6.26% are obtained.

EXAMPLE 8

A solution of 28.6 g of a condensation product of a polyethyleneimine having an average molecular weight of 30,000 to 40,000 and sodium monochloroacetate (ratio of nitrogen:chlorine 3:2) in 156 ml of water is added to a suspension of 36 g of mechanically-thermally digested wood fibres in 3 l of water at room temperature, whilst stirring. Thereafter, 42.8 g of cyanuric chloride dissolved in 240 ml of acetone are added dropwise in the course of 1¾ hours, after which the mixture is kept at a pH value of 1 for 18 hours and, after adding 247 ml of 4 N sodium hydroxide solution, at a pH value of 9 for 1½ hours. The product is filtered off and washed thoroughly. 335 g of a brown adsorbent with a solids content of 33.8% and a nitrogen content of 1.56% are obtained.

EXAMPLE 9

34.16 g of a condensation product of a polyamidepolyamine having an amine value of 350 to 400 mg of KOH/g, manufactured from polymerised linoleic acid/linolenic acid and triethylenetetramine, and sodium monochloroacetate (ratio of basic nitrogen:chlorine 3:2) are added dropwise to a suspension of 50 g of bleached spruce sulphite cellulose pulp in 8 l of water in the course of 60 minutes at room temperature. 35.7 g of cyanuric chloride dissolved in 200 ml of acetone are then poured in in the course of 10 minutes, after which the temperature is increased to 50° C. and the pH value is adjusted to 9 by means of 182 ml of a 4 N sodium hydroxide solution and kept constant for 21 hours. The product is filtered off and washed thoroughly. 221.4 g of an adsorbent with a solids content of 23% and a nitrogen content of 0.2% are obtained.

EXAMPLE 10 a. 202 g of diethyl adipate and 267 g of tetraethylenepentamine are heated to 160° C. under nitrogen, whilst stirring. After a reaction time of 18 hours, 372 g of a viscous, brown polymeric mass are obtained. The polymer is cooled to 25° C. and diluted with 600 ml of water and 46.7 g of sodium chloroacetate are added at a temperature of 80° C. Thereafter, the pH value is kept at 9 for 5 hours by means of 45 ml of a 4 N sodium hydroxide solution. The product is cooled to 25° C. and the pH value is adjusted to 7 by means of 125 ml of 10 N sulphuric acid. 1,258 g of a brown solution are obtained.

b. 643 ml of the polymer manufactured according to (a) are poured into a suspension of 34.8 g of bleached spruce sulphite cellulose pulp in 700 ml of water in the course of 35 minutes. 16.6 g of cyanuric chloride dissolved in 95 ml of acetone are added dropwise in the course of 1½ hours, whilst stirring. The suspension is then further stirred for 18 hours at 28° C. and at a pH value of 3. Thereafter, the pH value is adjusted to 9 by means of 198 ml of a 4 N sodium hydroxide solution and kept constant for 7 hours. The product is filtered off and washed thoroughly with 5 l of water. 123.7 g of an adsorbent with a solids content of 28.9% are obtained.

EXAMPLE 11

27.4 g of a product of polyethyleneimine having an average molcular weight of 30,000 to 40,000 and crotonic acid (ratio of basic nitrogen:double bond 3:2) dissolved in 191 ml of water are added dropwise to a suspension of 34.8 g of bleached spruce sulphite cellulose pulp in 600 ml of water at 25° C. in the course of 90 minutes. Thereafter, 16.6 g of cyanuric chloride dissolved in 100 ml of acetone are poured in in the course of 2.5 hours and the mixture is stirred for 20 hours. After adding 46 ml of a 4 N sodium hydroxide solution, the reaction mixture is then kept at a pH value of 9 for 5 hours. The product is filtered off and washed thoroughly. 201.8 g of an adsorbent with a solids content of 27.3% and a nitrogen content of 11.05% are obtained.

EXAMPLE 12

32.5 g of a product of polyethyleneimine having an average molecular weight of 30,000 to 40,000 and maleic acid (ratio of basic nitrogen:double bond 3:2) dissolved in 347 ml of water are added dropwise to a suspension of 34.8 g of bleached spruce sulphite cellulose pulp in 600 ml of water at 25° C. in the course of 90 minutes. Thereafter, 16.6 g of cyanuric chloride dissolved in 100 ml of acetone are poured in in the course of 2 hours, after which the mixture is stirred for 20 hours. By adding 19 ml of a 10 N sodium hydroxide solution, the reaction mixture is kept at a pH value of 9 for 5 hours. The product is filtered off and washed thoroughly.

199.3 g of an adsorbent with a solids content of 29.1% and a nitrogen content of 10.3% are obtained.

EXAMPLE 13 a. 16.2 g of N,N'-dimethylolurea dissolved in 350 ml of water are added to 22.05 g of a condensation product of a polyethyleneimine having an average molecular weight of 30,000 to 40,000 and sodium monochloroacetate (ratio of basic nitrogen:chlorine 3:2) dissolved in 123 ml of water. Thereafter, 2.5 g of zinc nitrate hexahydrate are added and the solution is adjusted to pH 3 by means of 30 ml of 2 N hydrochloric acid.

b. 9.16 g of filter paper (weight per unit area 100 g/m$^2$) are impregnated with the acid solution prepared according to (a) so that 18.45 g of the acid solution are taken up by the paper. The impregnated paper is dried for 10 minutes at 105° C. and treated at 165° C. for 1½ minutes. Thereafter, the paper is washed with water and dried. The nitrogen content of this adsorbent is 1.85%.

EXAMPLE 14 a. 17.5 g of hexamethylolmelamine hexamethyl ether dissolved in 50 ml of acetone are added to a solution of 22.05 g of a condensation product of a polyethyleneimine having an average molecular weight of 30,000 to 40,000 and sodium monochloroacetate (ratio of basic nitrogen:chlorine 3:2) in 123 ml of water. Thereafter, 2.5 g of zinc nitrate hexahydrate are added and the solution is adjusted to pH 3 by means of 36 ml of 2 N hydrochloric acid.

b. 11.38 g of filter paper (weight per unit area 100 g/m$^2$) are impregnated with the acid solution prepared according to (a) so that 18.47 g of the acid solution are taken up by the paper. The impregnated paper is dried for 10 minutes at 105° C. and then treated at 165° C. for 1.5 minutes. The paper is washed with water and dried. The nitrogen content of this adsorbent is 1.82%.

EXAMPLE 15 a. 14.3 g of a compound of the formula

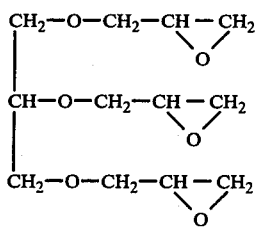

are added to a solution of 22.1 g of a condensation product of a polyethyleneimine having an average molecular weight of 30,000 to 40,000 and sodium monochloroacetate (ratio of basic nitrogen:chlorine 3:2) in 200 ml of water and the mixture is adjusted to a pH value of 10 by means of 5 N sodium hydroxide solution.

b. 11.42 g of filter paper (weight per unit area 100 g/m$^2$) are impregnated with the alkaline solution prepared according to (a) so that 21.34 g of the solution are taken up by the paper. The impregnated paper is dried for 25 minutes at 60° C. and treated at 165° C. for 5 minutes. The paper is washed with water and dried. The nitrogen content of this adsorbent is 2.54%.

EXAMPLE 16

A solution of 22.05 g of a condensation product of a polyethyleneimine having an average molecular weight of 30,000 to 40,000 and sodium monochloroacetate (ratio of basic nitrogen:chlorine 3:2) in 123 ml of water is added dropwise to a suspension of 34.8 g of bleached spruce sulphite cellulose pulp in 600 ml of water in the course of one hour. 20 g of an addition product of sodium bisulphite and toluylene diisocyanate are then added, after which the resulting suspension is kept at 93° C. and at a pH value of 9 for 15 hours. The product is then cooled, filtered off and washed thoroughly. 120 g of a white adsorbent with a solids content of 32.2% are obtained. The nitrogen content of a dried sample is 2.11%.

EXAMPLE 17

44.4 g of filter paper (weight per unit area 100 g/m$^2$) are treated with an aqueous solution, adjusted to pH 10, of a condensation product of polyethyleneimine having a molecular weight of 30,000 to 40,000 and sodium chloroacetate (ratio of basic nitrogen:chlorine 3:2) so that the weight increase of the air-dried filter paper is 49.2 g. 25 g of an aqueous, 10% strength solution, warmed to 40° C., of divinylsulphone are then applied to the paper by spraying. After drying, the paper is further treated at 150° to 165° C. for 5 minutes. The paper, washed with water and then dried, has a nitrogen content of 2.7%.

EXAMPLE 18

11.6 g of polyethyleneimine having an average molecular weight of 30,000 to 40,000 are added to a suspension of 34.8 g of bleached spruce sulphite cellulose pulp in 2 l of water, whilst stirring. Thereafter, 20.97 g of sodium chloroacetate, dissolved in 100 ml of water, and 16.6 g of cyanuric chloride, dissolved in 100 ml of acetone, are added dropwise, whilst stirring thoroughly, and the mixture is further stirred for 4 hours. The mixture is then adjusted from a pH value of 3.5 to pH 9 by means of a 5 N sodium hydroxide solution and it is left at pH 9 for 2 hours. The product is filtered off and washed thoroughly with 2.5 l of water. 305 g of an adsorbent with a solids content of 18.9% are obtained. The nitrogen content of the dry material is 11.4%.

EXAMPLE 19

11.6 g of polyethyleneimine having an average molecular weight of 30,000 to 40,000, dissolved in 500 ml of water, and 21 g of sodium chloroacetate, dissolved in 100 ml of water, are heated to 80° C., after which the mixture is kept at a pH of 9 for 2 hours by means of a 5 N sodium hydroxide solution. Thereafter, the solution is cooled to 25° C. A solution of 16.6 g of cyanuric chloride in 100 ml of water is added dropwise to this solution in the course of 30 minutes and the mixture is stirred for a further 30 minutes. Thereafter, the mixture is adjusted to a pH value of 9.6 by means of a 5 N sodium hydroxide solution and is kept at this pH value for 1.5 hours. 110.7 g of bleached spruce sulphite cellulose pulp with a solids content of 31.5% suspended in 2 l of water are added to this suspension, after which the new suspension is further stirred at a pH value of 9.6. The resulting product is then filtered off and washed thoroughly with 6 l of water. 216.6 g of an adsorbent with a solids content of 23.7% and a nitrogen content of 7.63% are obtained.

EXAMPLE 20 a. 11.6 g of polyethyleneimine having an average molecular weight of 30,000 to 40,000, dissolved in 500 ml of water, and 21 g of sodium chloroacetate, dissolved in 100 ml of water, are heated to 80° C., after which the mixture is kept at a pH value of 9 for 2 hours by means of a 5 N sodium hydroxide solution. Thereafter, the solution is cooled to 25° C.

b. A solution of 16.6 g of cyanuric chloride in 100 ml of acetone is added dropwise to a suspension of 110.7 g of bleached spruce sulphite cellulose pulp with a solids content of 31.5% in 2 l of water in the course of 15 minutes, whilst stirring, and the mixture is stirred for a further 30 minutes.

The condensation product obtained according to (a) is then added to the suspension obtained according to (b) in the course of 5 minutes. This mixture is stirred for 30 minutes at pH 2.5 and is then kept at pH 9 for 2.5 hours by means of a 5 N sodium hydroxide solution. The product is filtered off and washed thoroughly with water. 185 g of an adsorbent with a solids content of 26.22% and a nitrogen content of 6.72% are obtained.

EXAMPLE 21

16.6 g of cyanuric chloride dissolved in acetone are added dropwise to a suspension of 34.8 g of bleached sulphite cellulose pulp in 2,000 ml of water in the course of 23 minutes, whilst stirring. The pH value is then kept at pH 9 for 2 hours by means of a 5 N sodium hydroxide solution. Thereafter, 11.6 g of polyethyleneimine having an average molecular weight of 30,000 to 40,000 dissolved in 500 ml of water are added dropwise in the course of 30 minutes and the mixture is stirred for a further 2 hours. Thereafter, 21.84 g of sodium chloroacetate dissolved in 100 ml of water are added and the pH value is again kept at 9 for 20 hours by means of a 5 N sodium hydroxide solution. The product is filtered off and washed with water. 165.6 g of a white adsorbent with a solids content of 27.2% are obtained.

EXAMPLE 22

121.8 g of an 18% strength solution of sodium chloroacetate are added dropwise to a solution of 11.6 g of polyethyleneimine having an average molecular weight of 30,000 to 40,000 in 500 ml of water in the course of 2 minutes at 25° C. This reaction mixture is heated to 80° C., the pH value being kept at 9 for 2 hours by means of a 5 N sodium hydroxide solution. After cooling to 25° C., a suspension of 110.7 g of bleached spruce sulphite cellulose pulp with a solids content of 31.5% in 2 l of water is added and the mixture is stirred for a further 30 minutes. Thereafter, 16.6 g of cyanuric chloride dissolved in 100 ml of acetone are added dropwise in the course of 15 minutes and the pH value is kept at 9 for a further 2 hours by means of a 5 N sodium hydroxide solution. The product is filtered off and washed thoroughly with 4 l of water. 213.6 g of a light yellow adsorbent with a solids content of 20.5% are obtained.

EXAMPLE 23

20 g of the adsorbent cellulose material manufactured according to Example 1, which has been previously suspended in water, are added to 20 liters of an effluent of an after-coppering cotton dyeing process, which contains 45 ppm of $Cu^{++}$ and traces of a violet dyestuff and which has a pH value of 3.5. After a contact time of 10 minutes, whilst stirring, the precipitate obtained after the phase separation now contains only 1 ppm of $Cu^{++}$.

EXAMPLE 24

1 liter of a copper solution, which is adjusted to a pH value of 3 and which contains 50 mg of metal in the dissolved form, is initially introduced into a stirred reactor. In each case, 4 g of the modified cellulose materials manufactured according to the Examples are added to the liquor. In each experiment, after an adsorption time of 60 minutes, a sample is taken, which is filtered through a fluted filter, and the corresponding metal concentration, indicated in Table 1, in the filtrates is determined.

Table 1

| Adsorbent manufactured according to Example | Residual copper concentrations in mg/l after 60 minutes |
| --- | --- |
| 1 | 1.5 |
| 2 | 0.25 |
| 3 | 16 |
| 4 | 15 |
| 5 | 11 |
| 8 | 8.3 |
| 9 | 24 |

Table 1-continued

| Adsorbent manufactured according to Example | Residual copper concentrations in mg/l after 60 minutes |
| --- | --- |
| 12 | 22 |
| 16 | 21 |
| 17 | 24 |
| 19 | 0.2 |
| 20 | 0.3 |
| 21 | 0.3 |
| 22 | 0.2 |

EXAMPLE 25

1 liter of a mercury solution, which is adjusted to a pH value of 3 and which contains 50 mg of mercury in the dissolved form, is initially introduced into a stirred reactor. In each case, 5 g of the modified cellulose materials manufactured according to the Examples are added to the liquor. In each experiment, after an adsorption time of 60 minutes, a sample is taken, which is filtered through a fluted filter, and the corresponding metal concentration, indicated in Table 2, in the filtrates is determined.

Table 2

| Adsorbent manufactured according to Example | Residual mercury concentration in mg/l after 60 minutes |
| --- | --- |
| 1 | 0.1 |
| 2 | 0.1 |
| 3 | 6 |
| 4 | 3.5 |
| 5 | 0.9 |
| 6 | 1.3 |
| 7 | 1.2 |
| 8 | 0.7 |
| 11 | 0.7 |
| 12 | 3 |
| 13 | 1 |
| 14 | 20 |
| 16 | 9 |
| 17 | 12 |
| 18 | 0.8 |
| 19 | 0.3 |
| 20 | 0.5 |
| 21 | 0.2 |
| 22 | 0.5 |

EXAMPLE 26

1 liter of a silver solution, which is adjusted to a pH value of 3 and which contains 50 mg of silver in the dissolved form, is initially introduced into a stirred reactor. In each case, 5 g of the modified cellulose materials manufactured according to the Examples are added to the liquor. In each experiment, after an adsorption time of 60 minutes, a sample is taken, which is filtered through a fluted filter, and the corresponding silver concentration, indicated in Table 3, in the filtrates is determined.

Table 3

| Adsorbent manufactured according to Example | Residual silver concentration in mg/l after 60 minutes |
| --- | --- |
| 1 | 6.9 |
| 2 | 16.0 |
| 3 | 0.1 |
| 4 | 0.1 |
| 5 | 0.1 |
| 6 | 4.9 |
| 7 | 0.4 |
| 11 | 0.5 |
| 12 | 0.1 |
| 18 | 0.3 |
| 19 | 0.1 |
| 20 | 0.1 |
| 21 | 23 |
| 22 | 0.3 |

EXAMPLE 27

3 g of the adsorbent cellulose material manufactured according to Example 2, which has previously been suspended in water, are added to 1 liter of an effluent of a 2-hydroxyanthracene-3-carboxylic acid production, which contains 310 ppm of $Zn^{++}$ as an ammonia complex and which has a pH value of 9.4. After a contact time of 60 minutes, whilst stirring, the filtrate obtained after the phase separation now contains only 6 ppm of $Zn^{++}$.

EXAMPLE 28

34 g of the adsorbent cellulose material manufactured according to Example 2, which has previously been suspended in water, are added to 1 liter of an effluent of a 2-hydroxyanthracene-3-carboxylic acid production, which contains 1,700 ppm of $Zn^{++}$ as an ammonia complex and which has a pH value of 6. After a contact time of 60 minutes, whilst stirring, the filtrate obtained after the phase separation now contains only 16 ppm of $Zn^{++}$.

What is claimed is:

1. An adsorbent which has been manufactured from
   (1) a cellulose material, a reaction product of
   (2) a basic, nitrogen-containing polymer selected from the group consisting of a polyalkyleneimine having an average molecular weight of 5,000 to 200,000, a polyamidopolyamine from a polycarboxylic acid containing 2 to 10 carbon atoms and a polyamine, a polyamidopolyamine from a polymeric fatty acid and a polyamine and a polyamide resin which has been obtained by reacting an epihalogenohydrin with an aminopolyamide from a polyalkyleneamine and an aliphatic dicarboxylic acid containing 2 to 10 carbon atoms, and
   (3) a halogenoacetic acid, which is unsubstituted or substituted in the α-position by lower alkyl, lower alkoxy, hydroxy-lower alkyl, lower alkoxy-lower alkyl, lower alkylthio-lower alkyl, carboxy-lower alkyl, phenyl or benzyl, and
   (4) a crosslinking agent selected from the group consisting of
   a. a halogeno-diazine or halogenotriazine containing at least two mobile substituents,
   b. a 2-halogeno-benzothiazole-carboxylic acid halide or -sulphonic acid halide or a 2-halogeno-benzooxazole-carboxylic acid halide or -sulphonic acid halide,
   c. a halogeno-6-pyridazonyl-1-alkanoyl halide or a halogeno-6-pyridazonyl-1-benzoyl halide,
   d. an anhydride or halide of an aliphatic, α,β-unsaturated monocarboxylic or dicarboxylic acid,
   e. an anhydride or halide of an aliphatic monocarboxylic or dicarboxylic acid or of an aromatic carboxylic acid containing two mobile halogen atoms,
   f. a carboxylic acid N-methylolamide, N-chloromethylamide or N-bromomethylamide,
   g. an unetherified or etherified N-methylolurea or N-methylolmelamine and
   h. a condensation product of a diarylalkane containing at least one phenolic hydroxyl group and a halogenohydrin, or a glycerol triglycidyl ether.

2. An adsorbent according to claim 1, which has been obtained by mixing the cellulose material (1) with a reaction product of the basic, nitrogen-containing polymer (2) and component (4) and then reacting the mixture with the crosslinking component (3).

3. An adsorbent according to claim 1, which has been manufactured by reacting the condensate of components (2) and (4) with component (3) and subjecting the reaction product to a further condensation reaction with the cellulose material (1).

4. An adsorbent according to claim 1, which has been manufactured by reacting component (3) with the cellulose material (1) and further reacting the product with the reaction product of components (2) and (4).

5. An adsorbent according to claim 1, wherein component (3) is a halogeno-diazine or halogeno-triazine compound containing at least two mobile halogen atoms.

6. An adsorbent according to claim 1, wherein the basic polymer (2) is a polyalkyleneimine having an average molecular weight of 5,000 to 200,000.

7. An adsorbent according to claim 6, wherein the polyalkyleneimine is a polyethyleneimine having an average molecular weight of 10,000 to 100,000.

8. An adsorbent according to claim 1, wherein the basic polymer (2) is a polyamidopolyamine from a polycarboxylic acid containing 2 to 10 carbon atoms and a polyamine.

9. An adsorbent according to claim 1, wherein the basic polymer (2) is a polyamidopolyamine from a polymeric fatty acid and a polyamine.

10. An adsorbent according to claim 1, wherein the basic polymer (2) is a polyamide resin which has been obtained by reacting an epihalogenohydrin with an aminopolyamide from a polyalkyleneamine and an aliphatic dicarboxylic acid containing 2 to 10 carbon atoms.

11. An adsorbent according to claim 1, wherein component (4) is chloroacetic acid.

12. An adsorbent according to claim 1, wherein component (3) is a s-triazine compound with at least two halogen atoms bonded to ring carbon atoms.

13. An adsorbent according to claim 12, wherein component (3) is cyanuric chloride.

14. An adsorbent according to claim 1, which has been manufactured by reacting cellulose material with a condensation product of a polyethyleneimine having an average molecular weight of 10,000 to 100,000 and a halogenoacetic acid which is unsubstituted or substituted in the α-position by lower alkyl, lower alkoxy, hydroxy-lower alkyl, lower alkoxy-lower alkyl, lower alkylthio-lower alkyl, carboxy-lower alkyl, phenyl or benzyl and then subjecting the reaction product to a further condensation reaction with a halogeno-diazine or -triazine compound containing at least two mobile substituents.

15. A process for the manufacture of the adsorbent of claim 1, which comprises treating
   (1) cellulose material with, a reaction product of
   (2) a basic, nitrogen-containing polymer selected from the group consisting of a polyalkyleneimine having an average molecular weight of 5,000 to 200,000, a polyamidopolyamine from a polycarboxylic acid containing 2 to 10 carbon atoms and a polyamine, a polyamidopolyamine from a polymeric fatty acid and a polyamine, and a polyamide resin which has been obtained by reacting an epihalogenohydrin with an aminopolyamide from a polyalkyleneamine and an aliphatic dicarboxylic acid containing 2 to 10 carbon atoms, and
(3) a halogenoacetic acid, which is unsubstituted or substituted in the α-position by lower alkyl, lower alkoxy, hydroxy-lower alkyl, lower alkoxy-lower alkyl, lower alkylthio-lower alkyl, carboxy-lower alkyl, phenyl or benzyl, and
(4) a crosslinking agent selected from the group consisting of
  a. a halogeno-diazine or halogenotriazine containing at least two mobile substituents,
  b. a 2-halogeno-benzothiazole-carboxylic acid halide or -sulphonic acid halide or a 2-halogenobenzooxazole-carboxylic acid halide or -sulphonic-acid halide,
  c. a halogeno-6-pyridazonyl-1-alkanoyl halide or a halogeno-6-pyridazonyl-1-benzoyl halide,
  d. an anhydride or halide of an aliphatic, α,β-unsaturated monocarboxylic or dicarboxylic acid,
  e. an anhydride or halide of an aliphatic monocarboxylic or dicarboxylic acid or of an aromatic carboxylic acid containing two mobile halogen atoms,
  f. a carboxylic acid N-methylolamide, N-chloromethylamide or N-bromomethylamide,
  g. an unetherified or etherified N-methylolurea or N-methylolmelamine and
  h. a condensation product of a diaryalkane containing at least one phenolic hydroxyl group and a halogenohydrin, or a glycerol triglycidyl ether.

* * * * *

UNITED STATES PATENT AND TRADEMARK OFFICE
CERTIFICATE OF CORRECTION

PATENT NO. : 4,144,190

DATED : March 13, 1979

INVENTOR(S) : Quentin Bowes et al

It is certified that error appears in the above-identified patent and that said Letters Patent is hereby corrected as shown below:

Title page

[73] Assignee — Delete "Basel" and insert --Basle--

[30] Foreign Application Priority Date — Second line delete "Oct. 3, 1976" and insert --Nov. 3, 1976--

[56] U.S. Patent Documents — Last line delete "Clotter" and insert --Cotter--

Signed and Sealed this Thirtieth Day of August 1983

[SEAL]

Attest:

GERALD J. MOSSINGHOFF

Attesting Officer — Commissioner of Patents and Trademarks